(12) United States Patent  
Green et al.

(10) Patent No.: US 8,807,930 B2
(45) Date of Patent: Aug. 19, 2014

(54) NON AXIS-SYMMETRIC STATOR VANE ENDWALL CONTOUR

(75) Inventors: Brian Green, New Haven, CT (US); Sean Nolan, Wethersfield, CT (US)

(73) Assignee: United Technologies Corporation, Hartford, CT (US)

( * ) Notice: Subject to any disclaimer, the term of this patent is extended or adjusted under 35 U.S.C. 154(b) by 469 days.

(21) Appl. No.: 13/286,374

(22) Filed: Nov. 1, 2011

(65) Prior Publication Data
US 2013/0108433 A1   May 2, 2013

(51) Int. Cl.
*F01D 9/04* (2006.01)
(52) U.S. Cl.
USPC .................................. 415/191; 415/211.2
(58) Field of Classification Search
CPC ....................................................... F01D 9/041
USPC .................................. 415/191, 199.5, 211.2
See application file for complete search history.

(56) References Cited

U.S. PATENT DOCUMENTS

| | | | |
|---|---|---|---|
| 2,859,934 A | 11/1958 | Halford et al. | |
| 4,194,869 A * | 3/1980 | Corcokios | 415/209.4 |
| 5,088,892 A | 2/1992 | Weingold et al. | |
| 5,397,215 A * | 3/1995 | Spear et al. | 415/191 |
| 5,447,413 A | 9/1995 | Maier et al. | |
| 6,238,713 B1 | 5/2001 | Von Rhein | |
| 6,312,221 B1 | 11/2001 | Yetka et al. | |
| 6,419,446 B1 | 7/2002 | Kvasnak et al. | |
| 6,619,916 B1 | 9/2003 | Capozzi et al. | |
| 6,669,445 B2 | 12/2003 | Staubach et al. | |
| 6,969,232 B2 | 11/2005 | Zess et al. | |
| 7,220,100 B2 * | 5/2007 | Lee et al. | 415/191 |
| 7,354,243 B2 | 4/2008 | Harvey | |
| 7,465,155 B2 | 12/2008 | Nguyen | |
| 8,647,067 B2 * | 2/2014 | Pandey et al. | 416/223 R |
| 2008/0267772 A1 | 10/2008 | Harvey et al. | |
| 2009/0035130 A1 | 2/2009 | Sonoda et al. | |
| 2010/0303627 A1 | 12/2010 | Megerle et al. | |
| 2011/0123322 A1 | 5/2011 | Allen-Bradley et al. | |

* cited by examiner

*Primary Examiner* — Ninh H Nguyen
(74) *Attorney, Agent, or Firm* — Kinney & Lange, P.A.

(57) ABSTRACT

An airfoil comprises pressure and suction surfaces extending axially from a leading edge to a trailing edge and radially from a root section to a tip section, defining a mean span therebetween. An inner endwall defines an inner endwall contour extending axially and circumferentially from the root section, and an outer endwall defines an outer endwall contour extending axially and circumferentially from the tip section. The inner and outer endwall contours are defined by varying radial deviations from circumferentially uniform nominal inner and outer radii, where one of the radial deviations varies axially and circumferentially by at least three percent of a mean span of the airfoil.

25 Claims, 4 Drawing Sheets

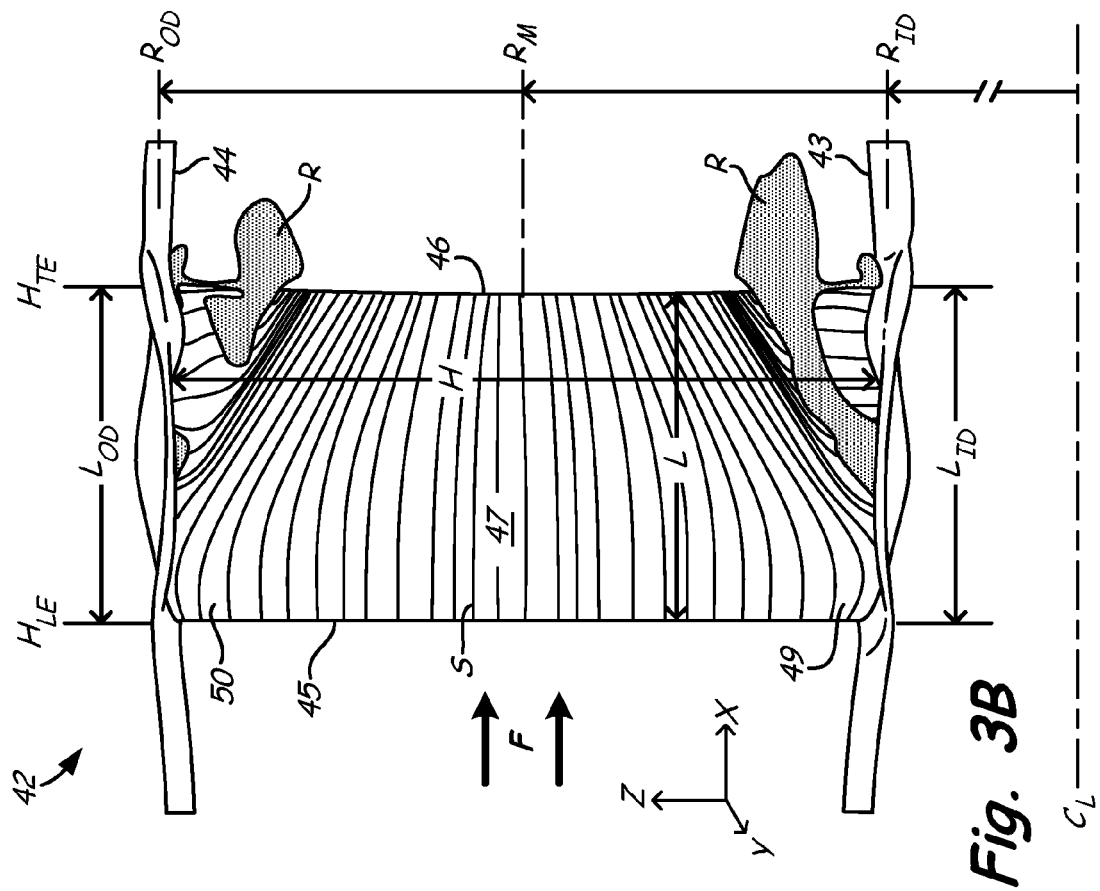
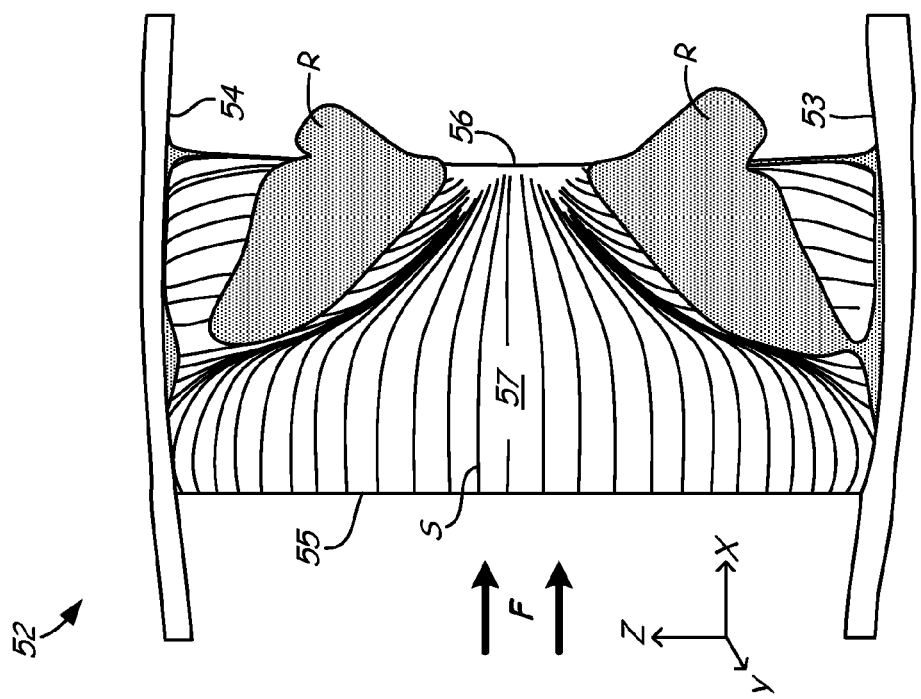
Fig. 3B
Fig. 3A (Prior Art)

NON AXIS-SYMMETRIC STATOR VANE ENDWALL CONTOUR

BACKGROUND

This invention relates generally to turbomachinery, and specifically to stator vanes for the compressor, turbine or fan section of a gas turbine engine. In particular, the invention concerns a stator vane airfoil with axial and circumferential endwall contouring.

Gas turbine engines provide reliable, efficient power for a wide range of applications, including aviation and industrial power generation. Modern designs are typically built around a power core made up of a compressor, combustor and turbine section, arranged in flow series with an upstream inlet and downstream exhaust.

The compressor section compresses air from the inlet, which is mixed with fuel in the combustor and ignited to generate hot combustion gas. The turbine section extracts energy from the expanding combustion gas, and drives the compressor via a common shaft. Energy is delivered in the form of rotational energy in the shaft, reactive thrust from the exhaust, or both.

Small-scale gas turbine engines generally utilize a one-spool design, with co-rotating compressor and turbine sections. Larger-scale combustion turbines, jet engines and industrial gas turbines (IGTs) are typically arranged into a number of coaxially nested spools, which operate at different pressures and temperatures, and rotate at different speeds.

The individual compressor and turbine sections in each spool are subdivided into a number of stages, which are formed of alternating rows of rotor blade and stator vane airfoils. The airfoils are shaped to turn the working fluid flow, and to generate lift for conversion to rotational energy in the turbine.

Aviation applications include turbojet, turbofan, turboprop and turboshaft configurations. Turbojets are an older design, in which thrust is generated primarily from the exhaust. Modern fixed-wing aircraft typically employ turbofan and turboprop engines, in which the low pressure spool is coupled to a propulsion fan or propeller. Turboshaft engines are used on rotary-wing aircraft, including helicopters.

Across these different gas turbine applications, engine performance depends strongly on precise flow control over the stator vane airfoils. Flow control, in turn, depends not only on airfoil design, but also on the structure of the adjacent flowpath, as defined along the inner and outer endwalls of the flow duct, adjacent the airfoil surfaces.

SUMMARY

This invention concerns a stator or vane airfoil. The airfoil has pressure and suction surfaces extending axially from a leading edge to a trailing edge, and radially from a root section to a tip section. The root and tip sections define a mean span therebetween.

An inner endwall extends axially and circumferentially from the root section of the airfoil, defining the inner endwall contour. An outer endwall extends axially and circumferentially from the tip section, defining the outer endwall contour.

At least one of the inner and outer endwall contours is non axis-symmetric. In particular, the contour is defined by non axis-symmetric radial deviations from a nominal endwall radius, where nominal radius is circumferentially uniform and the radial deviations vary both axially and circumferentially with respect to the nominal radius, by at least three percent of the mean span.

BRIEF DESCRIPTION OF THE DRAWINGS

FIG. 3A is a side view of an airfoil with axis-symmetric inner and outer endwall contours.

FIG. 3B is a side view of an airfoil with non axis-symmetric inner and outer endwall contours.

DETAILED DESCRIPTION

Figure 1:
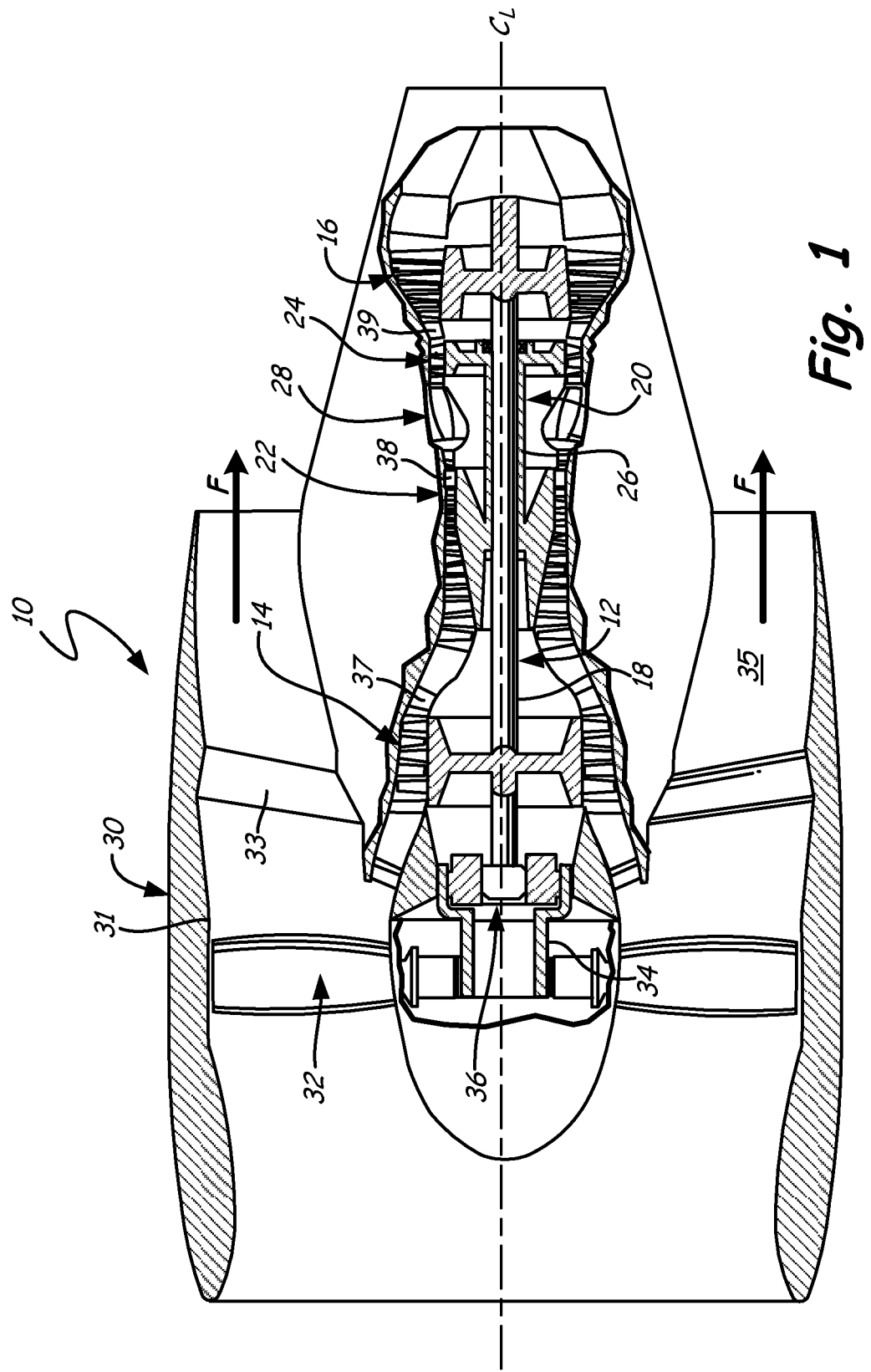
FIG. 1 is a cross-sectional view of a gas turbine engine.

FIG. 1 is a cross-sectional view of gas turbine engine 10, in a two-spool turbofan configuration for use as a propulsion engine on an aircraft. As shown in the figure, low spool 12 includes low pressure compressor (LPC) 14 and low pressure turbine (LPT) 16, rotationally coupled via low pressure shaft 18. High spool 20 includes high pressure compressor (HPC) 22 and high pressure turbine (HPT) 24, rotationally coupled via high pressure shaft 26. High spool 20 is coaxially oriented about low spool 12, along engine centerline (or turbine axis) $C_L$, with combustor 28 positioned in flow series between high pressure compressor 22 and high pressure turbine 24.

Nacelle 30 is oriented about the forward end of gas turbine engine 10, with fan casing 31 extending on the radially inner surface from propulsion fan 32 to fan exit guide vane (FEGV) 33. Fan shaft 34 is rotationally coupled to fan 32, generating propulsive flow F through fan duct (or bypass duct) 35. In advanced engine designs, fan drive gear system 36 couples fan shaft 34 to low spool 12, providing independent fan speed control for reduced noise and improved operating efficiency.

As shown in FIG. 1, gas turbine engine 10 includes stator vane stages or rows distributed throughout low spool 12, high spool 20, low pressure turbine 16, high pressure turbine 24 and fan exit guide vane 33. These vane rows include, but are not limited to, highly loaded vane airfoils such as fan exit guide vanes 33 for fan rotor 32, compressor exit guide vanes 37 and 38 for low pressure compressor 14 and high pressure compressor 22, and turbine vane row 39 for low pressure turbine 16 or high pressure turbine 24. Alternatively, gas turbine engine 10 is configured as a turbofan, turboprop, turbojet or turboshaft engine with one, two, three or more co-rotating or contra-rotating spools, or a multi-spool industrial gas turbine, as described above, and the number, location and configuration of individual vanes rows 33, 37, 38 and 39 vary accordingly Each vane row is defined by arranging a number of individual vane airfoils circumferentially about turbine axis $C_L$. The inner and outer endwalls define flow ducts through low pressure compressor 14, low pressure turbine 16, high pressure compressor 22, high pressure turbine 24, and, in turbofan configurations, bypass duct (or fan duct) 35. Additional vane rows are positioned in transition ducts located between the individual compressor and turbine sections.

To improve efficiency and thrust performance, one or more of these vane rows is provided with non axis-symmetric endwall contouring. In this technique, the inner and outer endwall contours vary not only axially but also in a circumferential direction about turbine axis $C_L$, in order to reduce secondary flow and endwall roll-up effects that contribute to flow separation. This approach also increases overall diffusion capability, as described below.

Figure 2:
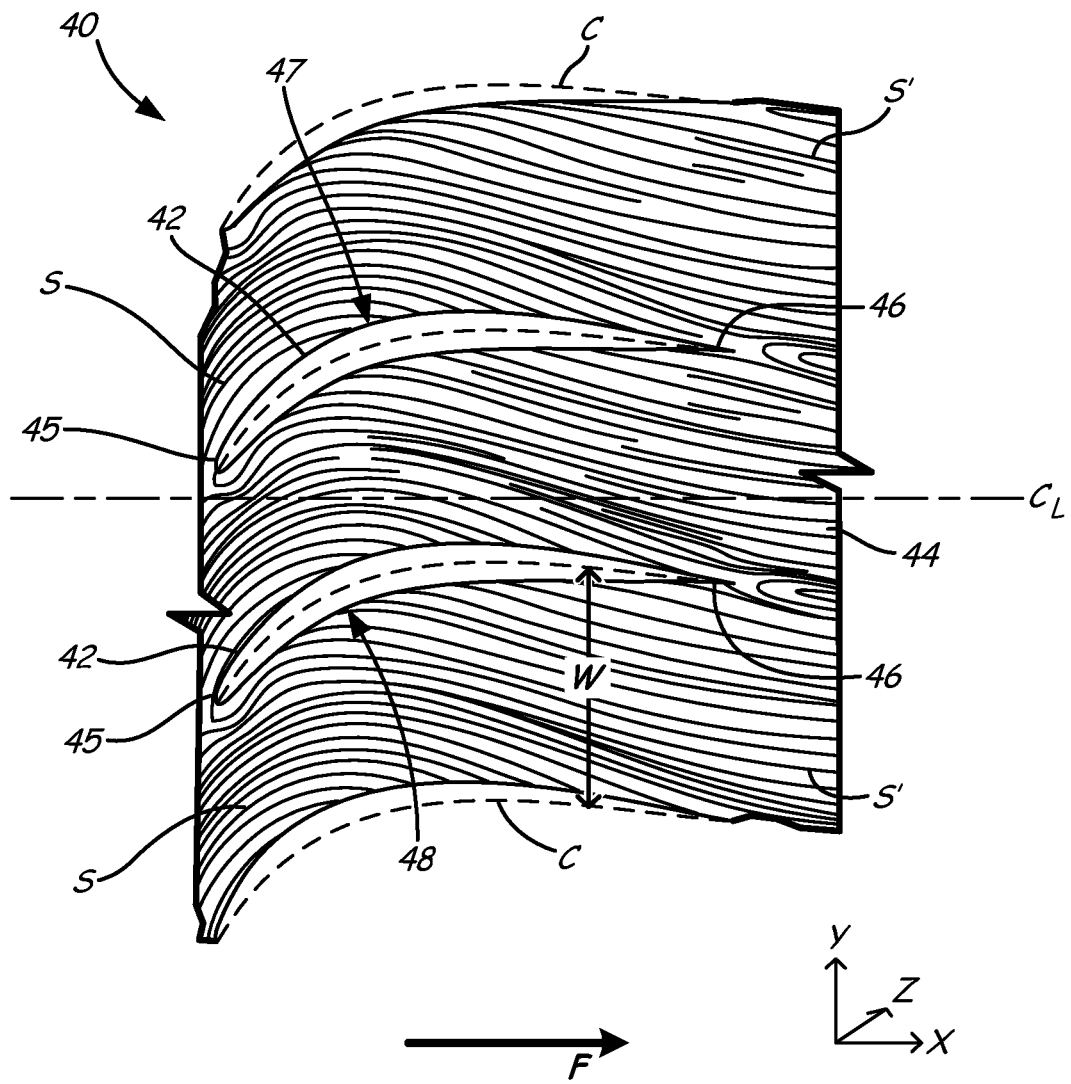
FIG. 2 is a radial view of a stator stage, illustrating secondary flow effects in the endwall region.

FIG. 2 is a radial view of stator row (vane row or vane stage) 40, illustrating the secondary flow field. Stator row 40 is formed of a number of individual stator vane airfoils 42, circumferentially arranged about turbine axis $C_L$. Streaklines S represent secondary flow along a radially outer diameter (OD) or radially inner diameter (ID) endwall 44.

Flow proceeds from left to right in FIG. 2, in a generally downstream axial direction (arrow F) along gas turbine axis $C_L$, from leading edge 45 to trailing edge 46 of individual airfoil sections 42. Streaklines S represent the positions of fluid elements that have passed through a particular spatial point, for example as indicated by dye injection. Alternatively, streamlines may be used, tangent to the direction of flow, showing the instantaneous flow direction, or the flow field is represented by pathlines oriented along the trajectories followed by individual fluid particles, or timelines formed by marking a set of fluid particles, following the displacements over time.

Airfoil sections (or airfoil portions) 42 are shown in a radially outward view, looking out from turbine axis $C_L$ (along the ±x axis) in the radial direction (+z axis), toward endwall 44. Individual airfoil portions 42 are defined between convex (suction) surfaces 47 and concave (pressure) surfaces 48, extending axially from leading edge 45 to trailing edge 46. Endwall 44 is defined between airfoil portions 42, extending circumferentially (along the ±y axis) between adjacent suction surfaces 47 and pressure surfaces 48.

In typical designs, endwalls 44 are formed along adjacent platform surfaces, which are attached to airfoil portions 42 to form a vane airfoil part or a blade airfoil part. Alternatively, airfoil portions 42 are formed independently, without platform surfaces, and mounted to endwalls 44. Thus, as defined herein, surface 44 is an inner or outer endwall surface, formed along an inner or outer platform extending axially and circumferentially from the root or tip section of airfoil portion 42, and surface 44 is an inner or outer platform surface, forming the inner or outer endwall extending axially and circumferentially from the root or tip section of airfoil portion 42.

Camber lines C define the mean line of the airfoil profile, halfway between suction surface 47 and pressure surface 48. Circumferential passage width W is defined between camber lines C of adjacent airfoils 42, measured circumferentially about turbine axis $C_L$ along ID or OD endwall 44.

As shown in FIG. 2, vane airfoils 42 are shaped to reduce swirl in the flow field. In particular, airfoils 42 turn the circumferential components of upstream streaklines S, to the left of vane row 40, in order to generate predominantly axial downstream streaklines S', to the right of vane row 40.

Above a certain diffusion factor or level of flow turning, airfoils 42 may exhibit inefficient turning due thickening and separation of the boundary flow layers, and other loss effects. Loss effects are compounded near the ID and OD endwalls, due to the additional endwall boundary layer flow and associated secondary flow effects. The cross-passage pressure gradient and low streamwise velocity generated by vane airfoils 42 also create cross-passage flow between adjacent airfoils 42, creating vorticity and endwall roll-up. These effects contribute to corner separation at the ID and OD endwalls, beginning at trailing edge 46 and proceeding upstream along suction surface 47 of airfoil 42.

To address these effects, vane row 40 is provided with non axis-symmetric endwall contouring. In particular, the contour of endwall 44 is defined by radial variations in both the axial direction, along engine centerline $C_L$ (±x axis), and in the circumferential direction, rotating about centerline $C_L$ along the ±y axis. Alternatively, non axis-symmetric contouring is applied to the inner endwall, or both the inner and outer endwalls, as described below, improving stator performance with respect to uncontoured and axis-symmetric endwall configurations.

FIG. 3A is a side view of airfoil 52 with uncontoured or axis-symmetric ID and OD endwalls 53 and 54. Flow is primarily axial (arrows F) onto airfoil 52, along streaklines S at leading edge 55. Regions R of negative axial velocity result from corner separation and endwall roll-up along trailing edge 56, extending onto the downstream regions of suction surface 57.

As shown in FIG. 3A, airfoil 52 has axis-symmetric ID and OD endwalls (or platforms) 53 and 54, with constant nominal inner and outer radii that are uniform along the circumferential direction (±y axis). This design is subject to substantial flow separation at the corner interfaces between trailing edge 56 and ID and OD endwalls 53 and 54, particularly under heavy loading. Boundary layer roll-up produces large regions R of reversed axial flow, increasing flow dynamic losses along suction surface 57.

Adding bow to airfoil 52 may delay corner separation, but this comes at the expense of midspan loading capability. With non axis-symmetric endwall contouring, on the other hand, it is possible to mitigate the effects of secondary flow along the endwalls, increasing the overall diffusion capability without substantial negative effects on loading.

FIG. 3B is a side view of airfoil 42 with contoured ID and OD endwalls (or platforms) 43 and 44. Flow is again primarily axial (arrow F) onto airfoil 42, along streaklines S from leading edge 45 to trailing edge 46. As shown in FIG. 3B, however, regions R of negative axial velocity are substantially reduced, as compared to the uncontoured (or axis-symmetric) design of FIG. 3A. There is also reduced corner separation along ID and OD endwalls 43 and 44, with less boundary layer roll-up from endwalls 43 and 44 onto suction surface 47.

Airfoil 42 is shown in circumferential view, looking down along the −y axis toward suction surface 47. Axial chord length L is defined along the engine centerline (x axis), between leading edge 45 and trailing edge 46.

In general, axial chord length L varies along the radial direction (+z axis), between root section 49 and tip section 50 of airfoil 42. The mean axial chord is given by the average of the ID and OD values:

$$\langle L \rangle = \frac{L_{ID} + L_{OD}}{2}. \quad [1]$$

Span height H is defined along the radial direction (+z axis), from root section 49, adjacent ID endwall (or ID platform) 43, to tip section 50, adjacent OD endwall (or OD platform) 44. Span height H varies along the axial direction (±x axis), with mean span given by the average at leading edge 45 and trailing edge 46:

$$\langle H \rangle = \frac{H_{LE} + H_{TE}}{2}. \quad [2]$$

Alternatively, the mean span and mean axial chord may be co-defined, for example using a mean blade section located halfway between root 49 and tip 50 of airfoil 42, or at half the mean span between ID endwall 43 and OD endwall 44.

The geometries of stator row 40 and airfoil 42 vary, depending on application. For some airfoils 42, the mean span ranges from about 0.4 inch (1.0 cm) to 1.2 inch (3.0 cm) or more, for example 0.60±0.05 inch, or 1.50±0.10 cm. Corresponding vane rows 40 may have a circumferentially uniform nominal inner radius ($R_{ID}$) of about 5 inches (12 cm) to 15 inches (38 cm) or more, for example 7.5±0.5 inches, or 19±1 cm. The circumferentially uniform nominal outer radius ($R_{ID}$) ranges from about 6 inches (15 cm) to 18 inches (45 cm) or more, for example 8.0±0.5 inches, or 20±1 cm. The mean flow duct radius ($R_M$) also varies, as defined at the midspan of airfoil 42 or at the center of the flow duct, midway between inner radius $R_{ID}$ and outer radius $R_{OD}$.

The contour of ID endwall 43 is defined by circumferential variations about uniform nominal inner endwall radius $R_{ID}$, as measured from engine centerline (or turbine axis) $C_L$. Similarly, the contour of OD endwall 44 is defined by circumferential variations about uniform nominal outer endwall radius $R_{OD}$. The radial variations are measured along the ±z axis, either toward or away from the middle of the flow passage, decreasing or increasing the flow area accordingly. The middle of the flow passage is defined at midspan (half the mean span), with mean radius $R_M$ located halfway between ID endwall 43 and OD endwall 44.

As shown in FIG. 3B, the contours of one or both of ID endwall 43 and OD endwall 44 vary as a function of axial position along the ±x axis, and as a function of circumferential position along the ±y axis. As a result, airfoil 42 has at least one ID or OD endwall contour that is asymmetric with respect to rotation about engine axis $C_L$.

This design reduces regions R of reversed axial flow across suction surface 47 of airfoil 42. Flow separation is decreased at the corner interfaces between trailing edge 46 and ID/OD endwalls 43 and 44, particularly under heavy loading of airfoil 42. Endwall roll-up is also decreased along trailing edge 46, particularly in the midspan region between root section 49 and tip section 50.

Figure 4A:
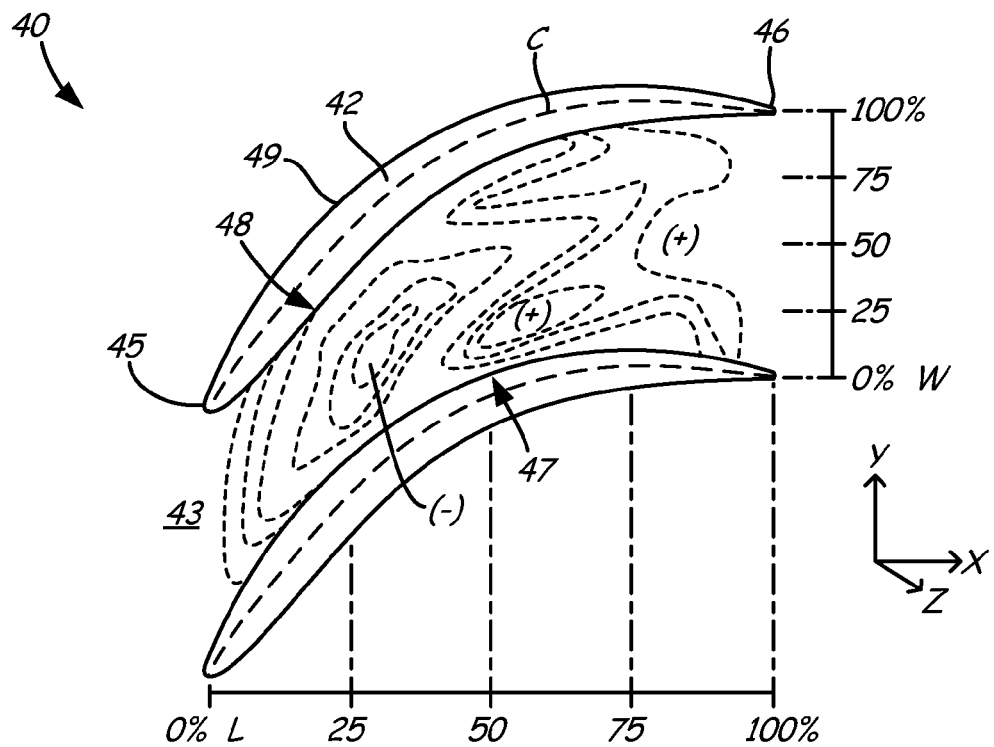
FIG. 4A is a radial view of a stator stage with a contoured inner diameter endwall.
Figure 4B:
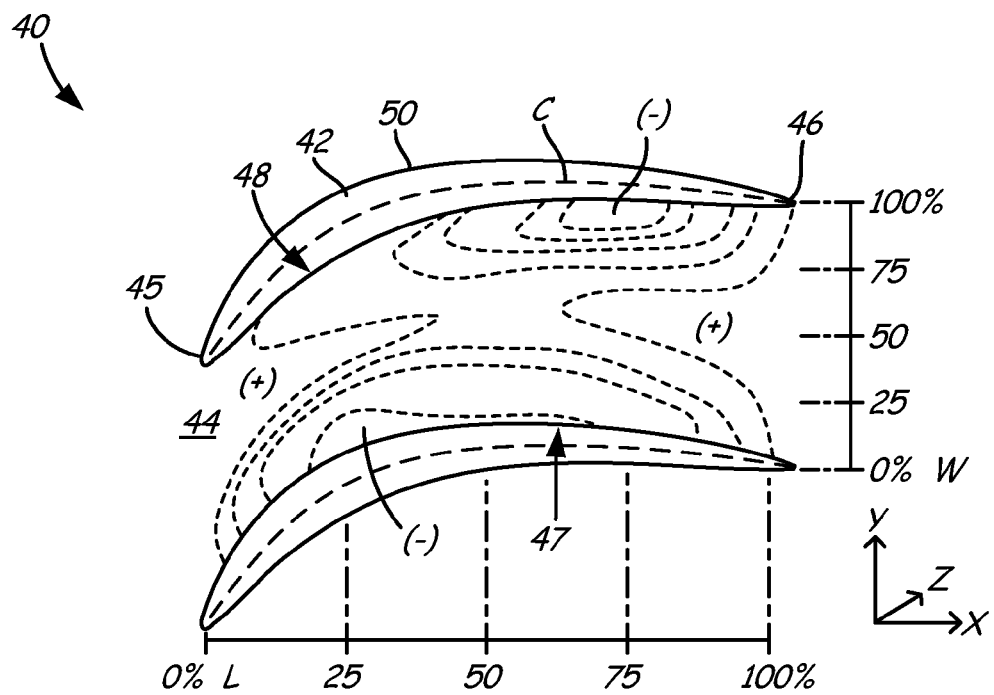
FIG. 4B is a radial view of a stator stage with a contoured outer diameter endwall.

FIGS. 4A and 4B are contour plots for ID endwall 43 and OD endwall 44 of vane row 40, illustrating non axis-symmetric contouring. Vane row 40 is shown in radially inward and outward views along the ±z axes, respectively. Camber lines C are defined for root airfoil section 49 in FIG. 4A, adjacent ID endwall 43, and for airfoil tip section 50 in FIG. 4B, adjacent OD endwall 44.

Suction surface 47 and pressure surface 48 extend axially along the gas turbine centerline, from 0% axial chord L at leading edge 45 to 100% axial chord L at trailing edge 46. ID endwall 43 extends circumferentially between root sections 49 of adjacent airfoils 42, with inter-vane passage width W defined from camber line C (at 0% passage width), and increasing in the +y direction from suction surface 47 toward the adjacent pressure surface 48.

Note that the coordinate system of FIGS. 4A and 4B is not necessarily orthogonal or Cartesian, because passage width W is defined between camber lines C, which are curved. To locate a point on ID or OD endwall 43 or 44, the relative axial chord L is identified between leading edge 45 (0% axial chord L) and trailing edge 46 (100% axial chord L), and extended in the circumferential direction (perpendicular to the engine axis) to camber line C. Circumferential passage width W is then measured between adjacent camber lines C, so that 50% passage width W is always midway between adjacent airfoil portions 42, following the contour of adjacent camber lines C. Thus, the 50% passage width point (and other values of passage width W) will vary in the axial direction, based on the shape of airfoil portions 42, as defined by the curvature of camber lines C along axial chord dimension L.

The endwall contours of FIGS. 4A and 4B are based on number of discrete control points defined in this way, as provided in Table 1 for ID endwall 43 and in Table 2 for OD endwall 44. The control points determine the deviations of the endwall contours from the circumferentially uniform nominal ID or OD radius, given as a percentage of the mean airfoil span height, and as a function of relative (or percentage) axial chord L and relative (or percentage) inter-vane passage width W.

In Table 1 and FIG. 4A, axial chord length L and camber lines C are each defined along root section 49 of airfoil 42, adjacent ID endwall 43. Circumferential passage width W is defined between adjacent camber lines C, measured along ID endwall 43 and increasing from suction surface 47 toward pressure surface 48. More negative values (−) indicate radial features that deviate toward the engine centerline or gas turbine axis, below the circumferentially uniform nominal ID radius and away from the middle of the flow passage (at the midspan of airfoil 42). More positive values (+) indicate radial features at or above the circumferentially uniform nominal ID radius, away from the gas turbine axis and toward the midspan.

In Table 2 and FIG. 4B, axial chord length L and camber lines C are defined along tip section 50, with circumferential passage width W measured circumferentially along OD endwall 44. More negative values (−) also indicate features that deviate away from the middle of the flow passage at midspan; that is, above the nominal OD radius and away from the gas turbine axis. More positive values (+) indicate features on or below the nominal OD radius, toward the gas turbine axis and toward the midspan.

Thus, negative values indicate radial features that extend away from the midspan in both Table 1 and Table 2, tending to increase the flow area between ID endwall 43 and OD endwall 44. More positive values, on the other hand, indicate features that extend radially toward the midspan, decreasing the flow area.

TABLE 1

ID Endwall Contour
(Control Points, % Mean Span)

| Axial Chord | Circumferential Width | | | | |
| --- | --- | --- | --- | --- | --- |
| | 0% W | 25 | 50 | 75 | 100% |
| 0% L | 0.00 | 0.00 | 0.00 | 0.00 | 0.00 |
| 25 | −1.10 | −5.38 | −6.16 | −3.83 | 0.00 |
| 50 | −6.52 | −0.22 | −4.83 | −1.33 | −4.44 |
| 75 | −5.11 | −1.39 | −0.76 | −1.22 | −0.35 |
| 100% | 0.00 | 0.00 | 0.00 | 0.00 | 0.00 |

TABLE 2

OD Endwall Contour
(Control Points, % Mean Span)

| Axial Chord | Circumferential Width | | | | |
| --- | --- | --- | --- | --- | --- |
| | 0% W | 25 | 50 | 75 | 100% |
| 0% L | 0.00 | 0.00 | 0.00 | 0.00 | 0.00 |
| 25 | −3.18 | −6.11 | −0.68 | −1.54 | 0.00 |
| 50 | −6.21 | −4.62 | −0.98 | −2.48 | −6.33 |
| 75 | −4.30 | −2.82 | −0.43 | −2.65 | −8.00 |
| 100% | 0.00 | 0.00 | 0.00 | 0.00 | 0.00 |

As shown in Tables 1 and 2, the endwall contours of both ID endwall 43 and OD endwall 44 are defined by radial deviations of at least three percent of the mean span, in both the axial and circumferential directions, for physical points located between suction surface 47 and pressure surface 48 of adjacent airfoils 42. In some locations, the radial deviation is more than five or six percent of the mean span.

For some vanes 22, the ID and OD contours substantially correspond to the sets of radial deviation values given in Tables 1 and 2, respectively. Both the ID and OD endwall contours may be expressed for hot or cold, coated or uncoated surfaces.

Alternatively, some vanes 22 incorporate one or more individual features of the ID or OD contour, rather than adopting a spline or polynomial fit to the set as a whole. Along ID endwall 43, for example, there is a feature with a radial deviation greater than five percent of the mean span, located between 25% and 50% of axial chord L, and between 25% and 75% of circumferential passage width W. More particularly, this feature has a maximum deflection centered at about 30±10% of axial chord L, and about 50±10% of circumferential width W.

Along OD endwall 44, there is a feature with a radial deviation greater than five percent of the mean span located between 50% and 75% of axial chord L, and between 75% and 100% of circumferential passage width W. More particularly, this feature has a maximum deflection centered at about 70±10% of axial chord L, and about 85±10% of circumferential width W. Another OD feature has a maximum deflection greater than five percent of the mean span centered at about 25±10% of axial chord L, and about 20±10% of circumferential width W.

Note that the control points at 0% and 100% of passage width W are not necessarily equal or periodic, in order to incorporate asymmetric fits for different contouring along suction surface 47 and pressure surface 48. In addition, the control points at 0% and 100% of circumferential passage width W both lie on the camber line, which lies within airfoil section 42. The physical endwall surfaces, on the other hand, extend between adjacent airfoil sections 42, from suction surface 47 to pressure surface 48.

Thus, substantial correspondence, as used herein, means substantial correspondence to the actual (physical) control points in Tables 1 and 2, located between suction surface 47 and pressure surface 48 of adjacent airfoils 42. Substantial correspondence also encompasses a polynomial or spline fit to the complete set of control points, for example using a third order spline fixed or anchored at the control points. For these applications, the endwall contours substantially correspond to the fitting function between suction surface 47 of one airfoil 42 and pressure surface 48 of an adjacent airfoil 42, but not necessarily within the cross section of the airfoil itself.

Further, substantial correspondence encompasses a nominal tolerance with respect to the actual (physical) control points and the fit functions, for example one or two percent of the mean span. Alternatively, the tolerance is absolute, for example two, five to ten mils; that is, within 0.002, 0.005 or 0.010 inches, or within about 0.05, 0.10 or 0.25 mm.

While this invention has been described with reference to exemplary embodiments, it will be understood by those skilled in the art that various changes may be made and equivalents may be substituted for elements thereof without departing from the spirit and scope of the invention. In addition, modifications may be made to adapt a particular situation or material to the teachings of the invention, without departing from the essential scope thereof. The invention, therefore, is not limited to the particular examples disclosed herein, but includes all embodiments falling within the scope of the appended claims.

The invention claimed is:

1. An airfoil comprising:
   pressure and suction surfaces extending axially from a leading edge to a trailing edge and radially from a root section to a tip section, the root and tip sections defining a mean span therebetween;
   an inner platform defining an inner endwall contour extending circumferentially from the root section, the inner endwall contour defined by varying radial deviations from a circumferentially uniform inner radius; and
   an outer platform defining an outer endwall contour extending axially and circumferentially from the tip section, the outer endwall contour defined by varying radial deviations from a circumferentially uniform outer radius;
   wherein the radial deviations of at least one of the inner and outer endwall contours vary axially and circumferentially by at least three percent of a mean span of the airfoil.

2. The airfoil of claim 1, wherein the radial deviations of the inner endwall contour substantially correspond to values given in Table 1 herein, the values extending axially from the leading edge and circumferentially from root section, the deviations expressed as a fraction of the mean span within a tolerance of two percent of the mean span.

3. The airfoil of claim 1, wherein the radial deviations of the inner endwall contour substantially correspond to a spline interpolation between values given in Table 1 herein, the values extending axially from the leading edge and circumferentially from the tip section, the deviations expressed as a fraction of the mean span within a tolerance of two percent of the mean span.

4. The airfoil of claim 3, wherein the mean span is between 0.4 inches and 1.2 inches, or between 1.0 cm and 3.0 cm.

5. The airfoil of claim 1, wherein the radial deviations of the outer endwall contour substantially correspond to values given in Table 2 herein, the values extending axially from the leading edge and circumferentially from the root section, the radial deviations expressed as a fraction of the mean span within a tolerance of two percent of the mean span.

6. The airfoil of claim 1, wherein the radial deviations of the outer endwall contour substantially correspond to a spline interpolation between values given in Table 2 herein, the values extending axially from the leading edge and circumferentially from the root section, the radial deviations expressed as a fraction of the mean span within a tolerance of two percent of the mean span.

7. The airfoil of claim 6, wherein the mean span is between 0.4 inches and 1.2 inches, or between 1.0 cm and 3.0 cm.

8. The airfoil of claim 1, wherein the inner endwall contour defines a maximum radial deviation of at least five percent of the mean span, the maximum radial deviation located axially between 25% and 50% of an axial chord extending from the leading edge, and circumferentially between 25% and 75% of a circumferential passage width defined from a mean camber line of the airfoil and increasing from the suction surface along the inner endwall contour.

9. The airfoil of claim 1, wherein the outer endwall contour defines a maximum radial deviation of at least five percent of the mean span, the maximum radial deviation located axially between 50% and 75% of an axial chord extending from the leading edge, and circumferentially between 75% and 100% of a circumferential passage width defined from a mean camber line of the airfoil and increasing toward the pressure surface along the outer endwall contour.

10. A compressor comprising a plurality of airfoils as defined in claim 1, the plurality of airfoils circumferentially arranged about an axis to define a flow duct between the inner endwall contour and the outer endwall contour.

11. The compressor of claim 10, wherein the plurality of airfoils defines a vane row for a high pressure section.

12. A vane comprising:
an airfoil portion having pressure and suction surfaces extending in an axial direction from a leading edge to a trailing edge, the leading and trailing edges extending in a radial direction from a root section to a tip section and defining a mean span therebetween;
an inner endwall extending in axial and circumferential directions adjacent the root section of the airfoil portion, the inner endwall having a non axis-symmetric contour defined by varying radial deviations from a circumferentially uniform nominal inner radius; and
an outer endwall extending in axial and circumferential directions adjacent the tip section of the airfoil portion, the outer endwall having a non axis-symmetric contour defined by varying radial deviations from a circumferentially uniform nominal outer radius;
wherein the radial deviations of the inner endwall and the outer endwall vary by at least three percent of the mean span along the axial and circumferential directions.

13. The vane of claim 12, wherein the radial deviations of the inner endwall substantially correspond to values given in Table 1 herein and the radial deviations of the outer endwall substantially correspond to values given in Table 2 herein, the values extending axially from the leading edge and circumferentially from the pressure and suction surfaces, the radial deviations expressed as a fraction of the mean span with a tolerance of two percent of the mean span.

14. The vane of claim 12, wherein the radial deviations of the inner endwall substantially correspond to a spline fit to values given in Table 1 herein and the radial deviations of the outer endwall substantially correspond to a spline fit to values given in Table 2 herein, the values extending axially from the leading edge and circumferentially from the pressure and suction surfaces, the radial deviations expressed as a fraction of the mean span with a tolerance of two percent of the mean span.

15. The vane of claim 14, wherein the mean span is between 0.4 inches and 1.2 inches, or between 1.0 cm and 3.0 cm.

16. A gas turbine engine comprising a plurality of vanes as described in claim 15, the plurality of vanes circumferentially arranged about an axis to define a flow duct between the inner and outer endwalls.

17. The gas turbine engine of claim 16, wherein the plurality of vanes defines an exit guide vane row for a high pressure compressor section.

18. The vane of claim 12, wherein the inner endwall includes a radial deviation of at least five percent of the mean span, the radial deviation of at least five percent located axially between 25% and 50% of an axial chord extending from the leading edge, and circumferentially between 25% and 75% of a circumferential passage width defined from a mean camber line of the airfoil and increasing from the suction surface along the inner endwall.

19. The vane of claim 12, wherein the outer endwall includes a radial deviation of at least five percent of the mean span, the radial deviation of at least five percent located axially between 50% and 75% of an axial chord extending from the leading edge, and circumferentially between 75% and 100% of a circumferential passage width defined from a mean camber line of the airfoil and increasing toward the pressure surface along the outer endwall contour.

20. A stator row comprising:
a plurality of airfoils disposed circumferentially about an axis, each of the airfoils having a pressure surface and a suction surface extending axially from a leading edge to a trailing edge and radially from a root section to a tip section, the root section and the tip section defining a mean span therebetween;
an inner endwall extending axially and circumferentially between the airfoils adjacent the root sections, the inner endwall having a non axis-symmetric contour defined by a varying radial deviation from a circumferentially uniform nominal inner radius; and
an outer endwall extending axially and circumferentially between the airfoils adjacent the tip section, the outer endwall having a non axis-symmetric contour defined by a varying radial deviation from a circumferentially uniform nominal outer radius;
wherein the radial deviations of the inner endwall and the outer endwall each vary both axially and radially by at least three percent of the mean span.

21. The stator row of claim 20, wherein the radial deviations of the inner endwall substantially correspond to a spline interpolation between values given in Table 1 herein, the values extending axially from the leading edge and circumferentially from the airfoil adjacent the root section, the radial deviations expressed as a fraction of the mean span with a tolerance of two percent of the mean span.

22. The stator row of claim 20, wherein the radial deviations of the outer endwall substantially correspond to a spline interpolation between values given in Table 2 herein, the values extending axially from the leading edge and circumferentially from the airfoil adjacent the tip section, the radial deviations expressed as a fraction of the mean span with a tolerance of two percent of the mean span.

23. A compressor comprising the stator row of claim 20.

24. The compressor of claim 23, wherein the stator row is comprised within a high pressure section.

25. The compressor of claim 23, wherein the stator row defines an exit guide vane row.

* * * * *